US007269495B2

(12) United States Patent
Katsumata

(10) Patent No.: US 7,269,495 B2
(45) Date of Patent: Sep. 11, 2007

(54) ENGINE OUTPUT CALCULATION METHOD AND ENGINE OUTPUT CALCULATION APPARATUS

(75) Inventor: Machiko Katsumata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/590,850

(22) Filed: Nov. 1, 2006

(65) Prior Publication Data

US 2007/0100534 A1 May 3, 2007

(30) Foreign Application Priority Data

Nov. 1, 2005 (JP) ............................ 2005-318702

(51) Int. Cl.
*G06F 17/00* (2006.01)

(52) U.S. Cl. ...................................... 701/103; 701/115

(58) Field of Classification Search ................ 701/103, 701/115, 102, 101
See application file for complete search history.

(56) References Cited

U.S. PATENT DOCUMENTS 5,577,474 A * 11/1996 Livshiz et al. .............. 123/352
5,848,371 A * 12/1998 Creger ....................... 701/101

FOREIGN PATENT DOCUMENTS

JP A-63-143384 6/1988
JP A-02-221662 9/1990
JP A-02-221664 9/1990
JP A-2001-227399 8/2001
JP A-2002-4928 1/2002
JP A-2003-120801 4/2003

OTHER PUBLICATIONS

M. Katsumata and Y. Kuroda, "Development of Engine Torque Simulation—Examination of Heat Releses Rate Estimation By Wiebe Function," 2006 SAE International, Sep. 27, 2006.

* cited by examiner

*Primary Examiner*—Hieu T. Vo
(74) *Attorney, Agent, or Firm*—Kenyon & Kenyon LLP

(57) ABSTRACT

The invention minimizes the man-hours required to develop a map that estimates the torque of an internal combustion engine. The method according to the invention includes making a torque estimation model that defines the relation between indicated torque and characteristic values that represent the flow of gas and the combustion state in an internal combustion engine; determining the value of a parameter that relates to a heat-generation rate ($dQ/d\theta$), which is the rate of change in a heating value Q in a cylinder with respect to the crank angle $\theta$, based on an operating condition of the engine; calculating the heat-generation rate under the desired operating condition; estimating the indicated torque of the internal combustion engine with the torque estimation model, using the heat-generation rate. The method according to the invention results in more accurate control over the operating state of an internal combustion engine.

25 Claims, 9 Drawing Sheets

ENGINE OUTPUT CALCULATION METHOD AND ENGINE OUTPUT CALCULATION APPARATUS

INCORPORATION BY REFERENCE

The disclosure of Japanese Patent Application No. 2005-318702 filed on Nov. 1, 2005 including the specification, drawings and abstract is incorporated herein by reference in its entirety.

BACKGROUND OF THE INVENTION 1. Field of the Invention

The invention relates to a method of calculating engine output and an apparatus that calculates engine output according to the calculation method. 2. Description of the Related Art Recently, it has become necessary to control internal combustion engines to further increase output, improve fuel efficiency, and reduce exhaust emissions. For example, Japanese Patent Application Publication No. JP-A-2002-4928 describes setting ignition timing while executing a model-based control that controls an actual air-fuel ratio to be a target air-fuel ratio. In particular, the ignition timing is set using a rich air-fuel ratio map when the target air-fuel ratio is rich and a lean air-fuel ratio map when the target air-fuel ratio is lean. If the target air-fuel ratio is between the values in the rich air-fuel ratio map and the values in the lean air-fuel ratio map, the ignition timing is set by applying linear interpolation between the two maps.

However, it is difficult to accurately determine the characteristic of the parameter relating to the operating condition of the engine, such as ignition timing, by applying linear interpolation between a plurality of maps. Thus, in the method described above, the value of the parameter determined by interpolation is generally inaccurate. Therefore, when the value of the parameter is determined by interpolation, the engine is operated based on an inaccurate value of the parameter, which decreases the reliability of the control.

Torque estimation models or maps used to estimate the torque of the engine may be made under various operating conditions to improve the accuracy of engine control. In this case, however, a greatly increased number of measurements must be taken, and the number of man-hours required to obtain such measurements increases accordingly. Because of the increased number of man-hours required to make the torque estimation models or the maps during the development of an internal combustion engine, the start of the analysis of the engine control is delayed. As a result, the development period of the engine is increased.

For example, the relation between the ignition timing and the torque is indicated by a curve represented by a quadratic equation or a quartic equation when the operating condition remains constant (i.e., the air-fuel ratio, engine speed, load factor, and valve timing remain the same). If the air-fuel ratio, engine speed, or load factor changes, the shape of the curve also changes. Therefore, if the maps are made using only data obtained empirically, the relation between the ignition timing and the torque needs to be measured a plurality of times under different operating conditions while the air-fuel ratio, engine speed, and load factor are changed. This increases the number of man-hours required to perform the measurements.

SUMMARY OF THE INVENTION

This invention minimizes the number of man-hours required to perform the measurements needed to make a map, a model, or an approximate expression for estimating the torque of an internal combustion engine, and allows accurate control of the operating state of the internal combustion engine.

According to a first aspect of the invention, an engine output calculation method includes: making a torque estimation model that defines the relation between the indicated torque and characteristic values that indicate the flow of gas and the combustion state in an internal combustion engine; determining the value of a parameter relating to a heat-generation rate $dQ/d\theta$ (i.e., the rate of change in a heating value Q in a cylinder with respect to the crank angle $\theta$), based on an operating condition; calculating the heat-generation rate $dQ/d\theta$ under a desired operating condition, using the value of the parameter; and estimating the indicated torque of the internal combustion engine based on the torque estimation model, using the heat generation rate $dQ/d\theta$. Accordingly, the indicated torque of the internal combustion engine can be accurately estimated based on the heat-generation rate $dQ/d\theta$.

The value of the parameter relating to a heat-generation rate $dQ/d\theta$ may be determined using a map or an approximation expression that defines the relation between the operating condition and the parameter. This obviates the necessity of calculating the value of the parameter under each operating condition, and reduces the number of man-hours required to perform measurement, and the amount of calculation.

The heat-generation rate $dQ/d\theta$ may be calculated using a function that includes a plurality of the parameters. The plurality of parameters are used to approximate the characteristic of the actual heat-generation rate . Therefore, the heat-generation rate $dQ/d\theta$ can be accurately calculated using the function.

In addition, the method may further include determining the actual heat-generation rate based on the measured value of a pressure in the cylinder under each of predetermined operating conditions; and making the map or the approximate expression that defines the relation between the operating condition and each of the plurality of the parameters, by determining the value of each of the plurality of the parameters such that the actual heat-generation rate matches the value calculated by the function, under each of the predetermined operating conditions. Therefore, the number of man-hours required to perform measurement can be reduced when the maps or the approximation expresses are made. Also, the maps or the approximation expressions can be made even when measurement cannot be performed in a stationary test. Therefore, the accuracy of estimating the torque can be improved.

According to a second aspect of the invention, an engine output calculation apparatus includes: a model making means for making a torque estimation model that defines a relation between indicated torque and characteristic values indicating a flow of gas and a combustion state in an internal combustion engine; a parameter determination means for determining a value of a parameter relating to a heat-generation rate $dQ/d\theta$ that is a rate of change in a heating value Q in a cylinder with respect to a crank angle $\theta$, based on an operating condition; a heat-generation rate calculation means for calculating the heat-generation rate $dQ/d\theta$ under a desired operating condition, using the value of the parameter; and an indicated torque estimation means for estimating the indicated torque of the internal combustion engine based on the torque estimation model, using the heat-generation rate dQ/dθ.

The parameter determination means may determine the value of the parameter using a map or an approximation expression that defines a relation between the operating condition and the parameter. This obviates the necessity of calculating the value of the parameter under each operating condition, and reduces the amount of calculation.

The heat-generation rate calculation means may calculate the heat-generation rate dQ/dθ using a function that includes a plurality of the parameters, and that approximates a characteristic of an actual heat-generation rate using the plurality of the parameters.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Figure 1:
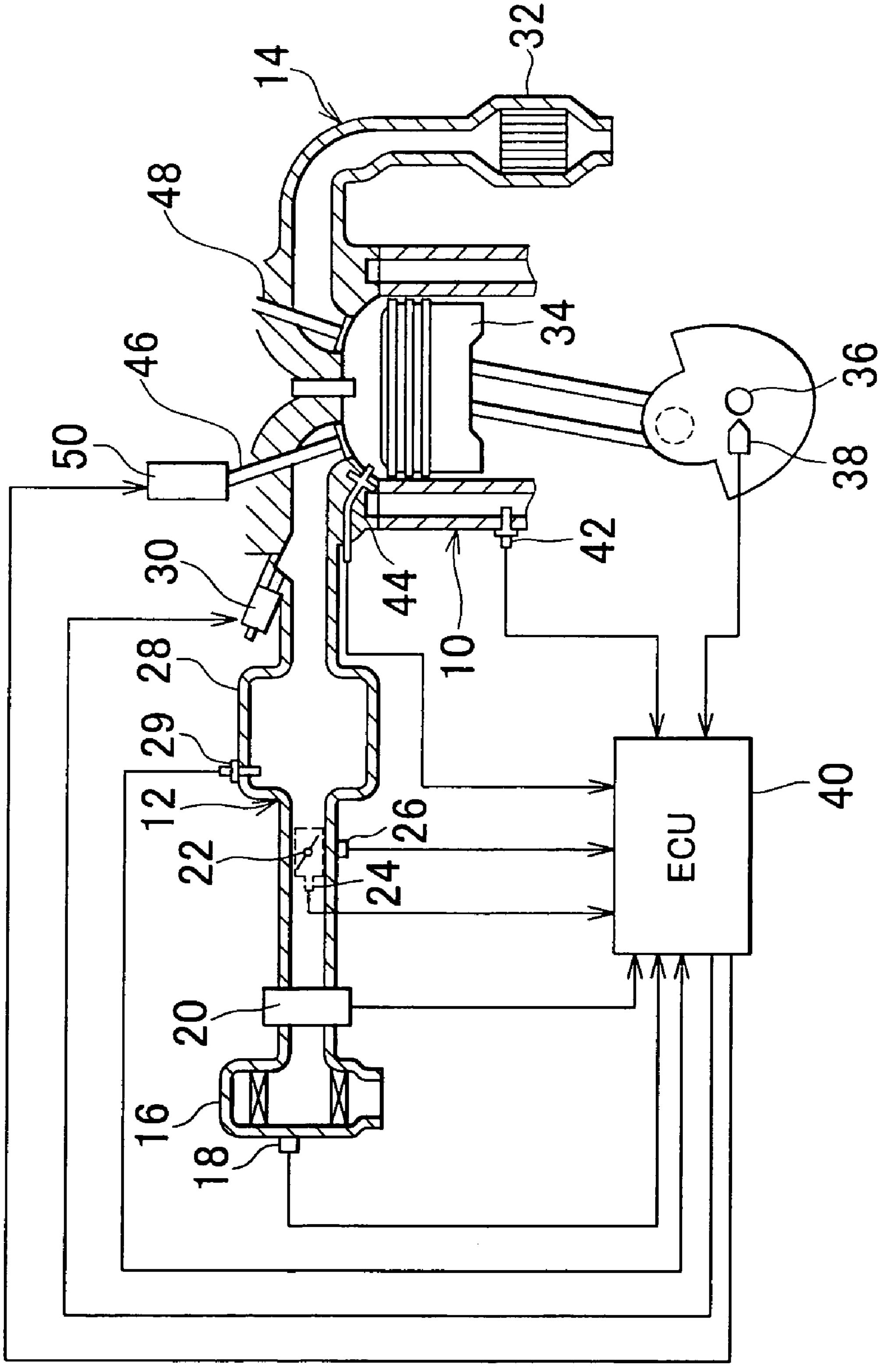
FIG. 1 is a schematic diagram showing the configuration of an internal combustion engine system in which the operating state of an internal combustion engine is determined and controlled using a method according to the embodiment of the invention.

An embodiment of the invention will be described with reference to the drawings. In the drawings, the same components are denoted by the same reference numerals, and redundant description will be omitted. The invention is not limited to the embodiment described below.

I. Configuration of System

FIG. 1 is a schematic diagram showing the configuration of an internal combustion engine system in which the operating state of an internal combustion engine is determined and controlled using a method according to the embodiment of the invention. The system in FIG. 1 includes an internal combustion engine 10. The internal combustion engine 10 is connected to an intake passage 12 and an exhaust passage 14. An air filter 16 is provided at the upstream end of the intake passage 12. An intake-air temperature sensor 18, which detects an intake-air temperature THA (i.e., atmospheric air temperature), is fitted to the air filter 16.

An airflow meter 20 is provided downstream of the air filter 16. A throttle valve 22 is provided downstream of the airflow meter 20. A throttle sensor 24 and an idle switch 26 are provided near the throttle valve 22. The throttle sensor 24 detects a throttle-valve opening amount TA. The idle switch 26 is turned on when the throttle valve 22 is completely closed.

A surge tank 28 is provided downstream of the throttle valve 22. The surge tank 28 is provided within an intake manifold. An intake-pipe pressure sensor 29, which detects the pressure in the intake passage 12 (i.e., intake pipe pressure), is provided near the surge tank 28. A fuel injection valve 30, which injects fuel into an intake port of the internal combustion engine 10, is provided downstream of the surge tank 28.

The internal combustion engine 10 is provided with an intake valve 46 and an exhaust valve 48. The intake valve 46 is connected to a variable valve timing mechanism 50 that changes the lift and/or the duration of the intake valve 46. An ignition plug, which ignites the fuel sprayed into a combustion chamber, is provided in a cylinder. A piston 34 is provided in the cylinder such that the piston 34 reciprocates in the cylinder. A coolant temperature sensor 42 is fitted to the internal combustion engine 10.

The piston 34 is connected to a crankshaft 36. The crankshaft is rotated by the reciprocating movement of the piston 34. A drivetrain and auxiliary devices (for example, the air conditioner compressor, an alternator, a torque converter, and the power steering pump etc.) are driven by the rotating toque of the crankshaft 36. A crank angle sensor 38, which detects the rotational angle of the crankshaft 36, is provided near the crankshaft 36. The internal combustion engine 10 is provided with a cylinder pressure sensor 44 that detects the pressure in the cylinder (i.e., cylinder pressure).

An exhaust-gas purification catalyst 32 is provided in the exhaust passage 14. The portion of the exhaust passage 14 between the exhaust-gas purification catalyst 32 and the internal combustion engine 10 is positioned in an exhaust manifold.

As shown in FIG. 1, a control apparatus in this embodiment includes an ECU (Electronic Control Unit) 40. The ECU 40 is connected to the above-described sensors, a knock control system (KCS) sensor that detects occurrence of knocking, and other sensors (not shown) that detect, for example, the vehicle speed, the engine speed, the temperature of exhaust gas, the temperature of lubricating oil, and the temperature of a catalyst bed. The ECU 40 is also connected to actuators for the fuel injection valve 30, and the variable valve timing mechanism 50.

II. Configuration of Torque Estimation Model

Figure 2:
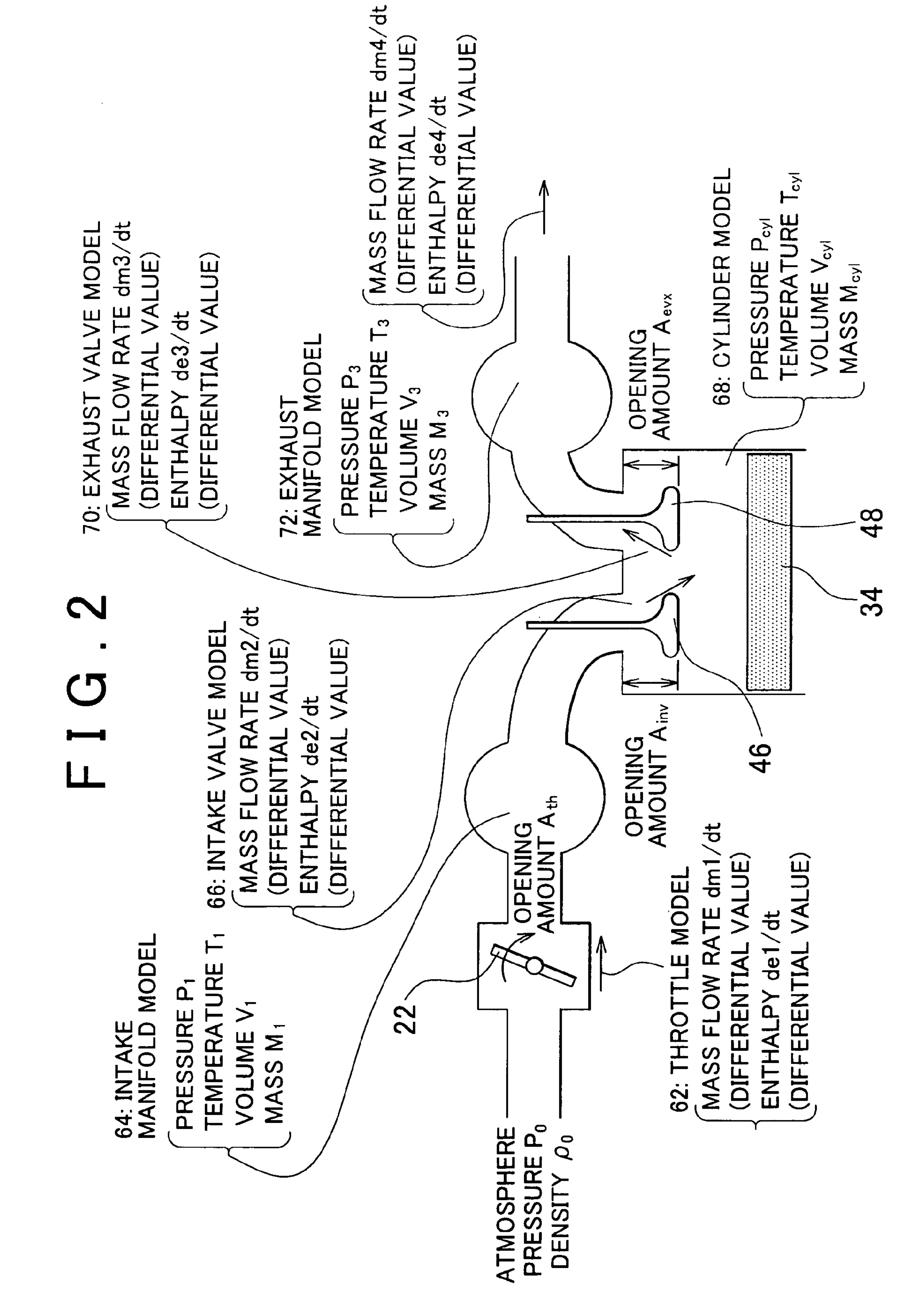
FIG. 2 is a schematic diagram showing the configuration of a torque estimation model according to the embodiment of the invention.

In this embodiment, the output (torque) of the crankshaft 36 is calculated using a torque estimation model. FIG. 2 is a schematic diagram showing the main portion of the configuration of the torque estimation model according to this embodiment. The torque estimation model includes an intake-air flow calculation model, an exhaust-gas flow calculation model, and a heat-generation calculation model; and the indicated torque is estimated by introducing the heat-generation rate dQ/dθ to the heat-generation calculation model. As shown in FIG. 2, the torque estimation model includes a throttle model 62, an intake manifold model 64, an intake valve model 66, a cylinder model (heat-generation model) 68, an exhaust valve model 70, and an exhaust manifold model 72. This approach may be used in the indicated torque estimation means of an apparatus according to the invention to estimate the indicated torque.

The models are classified into the group of "capacity elements" and the group of "flow elements". The capacity elements are modeled using a law of conservation of energy, a law of conservation of mass, and a state equation of gas, and the flow elements are modeled using a nozzle equation for compressible fluid. The intake manifold model 64, the cylinder model 68, and the exhaust manifold model 72 are regarded as "capacity elements". The throttle model 62, the intake valve model 66, and the exhaust valve model 70 are regarded as "flow elements".

In each capacity element, the mass flow rate of gas flowing into and out of the capacity element is stored. Energy balance is also stored in each capacity element. Further, in each capacity element, the state equation of gas is satisfied. In each flow element, the passage through which gas flows is short. Therefore, the capacity of the flow element is not taken into account. Thus, the flow rate of gas flowing through the flow element is calculated using the equation of compressible fluid. The torque equation model shown in FIG. 2 is formed by alternately arranging the capacity elements and the flow elements in a gas passage for the internal combustion engine, and connecting the capacity elements with the flow elements. Hereinafter, the physical equations representing each model will be described.

A. Throttle Model

The time-differential value $dm_1/dt$ of the mass flow rate $m_1$ of intake air flowing through the throttle valve 22 is calculated using equations (1) and (1)' described below. Equations (1) and (1)' are based on the general equation of compressible fluid. In equations (1) and (1)', "$A_{th}$" is the effective opening amount of the throttle valve 22, "$P_0$" is the pressure of gas upstream of the throttle valve 22 (i.e., atmospheric pressure), "$P_1$" is the pressure of gas in the intake manifold downstream of the throttle valve 22, "$\rho_0$" is the density of air upstream of the throttle valve 22, and "κ" is the ratio of specific heat capacities.

The time-differential value $de_1$ of the enthalpy $e_1$ of gas flowing through the throttle valve 22 is calculated using equation (2) described below. In equation (2), "κ" is the ratio of specific heat capacities. In this equation, the value of κ is a constant value. The value of κ is correlated with the degree of freedom of gas upstream of the throttle valve 22.

$$\frac{dm_1}{dt} = A_{th}\sqrt{2P_0\rho_0}\cdot\Phi \tag{1}$$

$$\Phi = \begin{cases} \sqrt{\dfrac{\kappa}{\kappa-1}\left\{\left(\dfrac{P_1}{P_0}\right)^{\frac{2}{\kappa}} - \left(\dfrac{P_1}{P_0}\right)^{\frac{\kappa+1}{\kappa}}\right\}} & \text{IF } \left(\dfrac{P_1}{P_0}\right) > \left(\dfrac{2}{\kappa+1}\right)^{\frac{\kappa}{\kappa-1}} \\ \left(\dfrac{2}{\kappa+1}\right)^{\frac{\kappa}{\kappa-1}}\sqrt{\dfrac{\kappa}{\kappa+1}} & \text{IF } \left(\dfrac{P_1}{P_0}\right) < \left(\dfrac{2}{\kappa+1}\right)^{\frac{\kappa}{\kappa-1}} \end{cases} \tag{1'}$$

$$\frac{de_1}{dt} = \frac{dm_1}{dt}\cdot\frac{\kappa}{\kappa-1}\frac{P_0}{\rho_0} \tag{2}$$

As described above, by employing the throttle model 62, the relation among the pressure $P_0$ of gas upstream of the throttle valve 22, the pressure $P_1$ of gas downstream of the throttle valve 22, the time-differential value $dm_1/dt$ of the mass flow rate $m_1$, and the time-differential value $de_1/dt$ of the enthalpy $e_1$ can be defined by the equations.

Equations (1) and (2) are obtained by differentiating the characteristic values with respect to time in one cycle. The equations described below are also obtained by differentiating characteristic values with respect to time in one cycle.

B. Intake Manifold Model (Surge Tank Model)

In the intake manifold model 64, equations are set up to calculate the mass $M_1$, the pressure $P_1$, the temperature $T_1$, and the volume $V_1$ of gas inside the intake manifold, based on the time-differential value $dm_1/dt$ of the mass flow rate $m_1$ of gas flowing upstream of the intake manifold, the time-differential value $de_1/dt$ of the enthalpy $e_1$, the time-differential value $dm_2/dt$ of the mass flow rate $m_2$ of gas flowing downstream of the intake manifold, and the time-differential value $de_2/dt$ of an enthalpy $e_2$. That is, in the intake manifold model 64, equations (3), (4), and (5) described below are satisfied. Equation (3) is based on the law of conservation of mass, equation (4) is based on the law of conservation of energy, and equation (5) is the state equation of gas. In equation (4), "$R_1$" is the gas constant of gas inside the intake manifold. In this equation, the gas constant is a constant value.

$$\frac{dM_1}{dt} = \frac{dm_1}{dt} - \frac{dm_2}{dt} \tag{3}$$

$$\frac{1}{\kappa-1}R_1\left(\frac{dM_1}{dt}T_1 + \frac{dT_1}{dt}M_1\right) = \frac{de_1}{dt} - \frac{de_2}{dt} \tag{4}$$

$$P_1V_1 = M_1R_1T_1 \tag{5}$$

As described above, by employing the intake manifold model 64, the relation among the mass $M_1$, the pressure $P_1$, the temperature $T_1$, and the volume $V_1$of gas inside the intake manifold, the time-differential value $dm_1/dt$ of the mass flow rate $m_1$ of gas flowing upstream of the intake manifold, the time-differential value $dm_2/dt$ of the mass flow rate $m_2$ flowing downstream of the intake manifold, the time-differential value $de_1/dt$ of the enthalpy $e_1$, and the time-differential value $de_2/dt$ of the enthalpy $e_2$ can be defined using the equations.

C. Intake Valve Model

The intake valve model 66 is represented by the general equations of compressible fluid, as well as the throttle model 62. The time-differential value $dm_2/dt$ of the mass flow rate $m_2$ of intake air flowing through the intake valve 46 is calculated using equations (6) and (6)' described below. In equations (6) and (6)', "$A_{inv}$" is the effective opening amount of the intake valve 46, "$P_1$" is the pressure of gas inside the intake manifold upstream of the intake valve 46, "$P_{cyl}$" is the pressure of gas downstream of the intake valve 46 (i.e., cylinder pressure), "$\rho_1$" is the density of air upstream of the intake valve 46, and "κ" is the ratio of specific heat capacities.

The time-differential value $de_2/dt$ of the enthalpy $e_2$ of gas flowing through the intake valve 46 is calculated using equation (7) described below. In equation (7), "κ" is the ratio of specific heat capacities. In this equation, the value of κ is a constant value. The value of κ is correlated with the degree of freedom of gas upstream of the intake valve 46.

$$\frac{dm_2}{dt} = A_{inv}\sqrt{2P_1\rho_1}\cdot\Phi \tag{6}$$

$$\Phi = \begin{cases} \sqrt{\frac{\kappa}{\kappa-1}\left\{\left(\frac{P_{cyl}}{P_1}\right)^{\frac{2}{\kappa}} - \left(\frac{P_{cyl}}{P_1}\right)^{\frac{\kappa+1}{\kappa}}\right\}} & \text{IF } \left(\frac{P_{cyl}}{P_1}\right) > \left(\frac{2}{\kappa+1}\right)^{\frac{\kappa}{\kappa-1}} \\ \left(\frac{2}{\kappa+1}\right)^{\frac{\kappa}{\kappa-1}}\sqrt{\frac{\kappa}{\kappa+1}} & \text{IF } \left(\frac{P_{cyl}}{P_1}\right) < \left(\frac{2}{\kappa+1}\right)^{\frac{\kappa}{\kappa-1}} \end{cases} \tag{6'}$$

$$\frac{de_2}{dt} = \frac{dm_2}{dt}\cdot\frac{\kappa}{\kappa-1}\frac{P_1}{\rho_1} \tag{7}$$

As described above, by employing the intake valve model 66, the relation among the pressure $P_1$ of gas flowing upstream of the intake valve 46,the pressure $P_{cyl}$ of gas flowing downstream of the intake valve 46, the time-differential value $dm_2/dt$ of the mass flow rate $m_2$ of gas flowing through the intake valve 46, and the time-differential value $de_2/dt$ of the enthalpy $e_2$ can be defined using the equations.

D. Exhaust Valve Model

The exhaust valve model 70 is also represented by the general equations of compressible fluid. The time-differential value $dm_3/dt$ of the mass flow rate $m_3$ of exhaust gas flowing through the exhaust valve 48 is calculated using equations (8) and (8)' described below. In equations (8) and (8)', "$A_{exv}$" is the effective opening amount of the exhaust valve 48, "$P_{cyl}$" is the pressure of gas flowing upstream of the exhaust valve 48 (i.e., cylinder pressure), "$P_3$" is the pressure of gas inside the exhaust manifold downstream of the exhaust valve 48, "$\rho_2$" is the density of gas in the cylinder upstream of the exhaust valve 48, and ""κ" is the ratio of specific heat capacities.

The time-differential value $de_3/dt$ of the enthalpy $e_3$ of gas flowing through the exhaust valve 48 is calculated using equation (9) described below. In equation (9), "κ" is the ratio of specific heat capacities. In this equation, the value of κ is a constant value. The value of κ is correlated with the degree of freedom of gas upstream of the exhaust valve 48.

$$\frac{dm_3}{dt} = A_{exv}\sqrt{2P_{cyl}\rho_2}\cdot\Phi \tag{8}$$

$$\Phi = \begin{cases} \sqrt{\frac{\kappa}{\kappa-1}\left\{\left(\frac{P_3}{P_{cyl}}\right)^{\frac{2}{\kappa}} - \left(\frac{P_3}{P_{cyl}}\right)^{\frac{\kappa+1}{\kappa}}\right\}} & \text{IF } \left(\frac{P_3}{P_{cyl}}\right) > \left(\frac{2}{\kappa+1}\right)^{\frac{\kappa}{\kappa-1}} \\ \left(\frac{2}{\kappa+1}\right)^{\frac{\kappa}{\kappa-1}}\sqrt{\frac{\kappa}{\kappa+1}} & \text{IF } \left(\frac{P_3}{P_{cyl}}\right) < \left(\frac{2}{\kappa+1}\right)^{\frac{\kappa}{\kappa-1}} \end{cases} \tag{8'}$$

$$\frac{de_3}{dt} = \frac{dm_3}{dt}\cdot\frac{\kappa}{\kappa-1}\frac{P_{cyl}}{\rho_2} \tag{9}$$

As described above, by employing the exhaust valve model 70, the relation among the pressure $P_{cyl}$ of gas flowing upstream of the exhaust valve 48, the pressure $P_3$ of gas flowing downstream of the exhaust valve 48, the time-differential value $dm_3/dt$ of the mass flow rate $m_3$ of gas flowing through the exhaust valve 48, and the time-differential value $de_3/dt$ of the enthalpy $e_3$ of gas flowing through the exhaust valve 48 can be defined using the equations.

E. Exhaust Manifold Model

The exhaust manifold model 72 is represented in the manner similar to the manner in which the intake manifold model 64 is represented. In the exhaust manifold model 72, equations are set up to calculate the mass $M_3$, the pressure $P_3$, the temperature $T_3$, and the volume $V_3$ of gas inside the exhaust manifold, based on the time-differential value $dm_3/dt$ of the mass flow rate $m_3$ of gas flowing upstream of the exhaust manifold, the time-differential value $de_3/dt$ of the enthalpy $e_3$, the time-differential value $dm_4/dt$ of the mass flow rate m4 of gas flowing downstream of the exhaust manifold, and the time-differential value de4/dt of an enthalpy $e_4$. That is, in the exhaust manifold model 72, equations (10), (11), and (12) described below are satisfied. The equation (10) is based on the law of conservation of mass, equation (11) is based on the law of conservation of energy, and equation (12) is the state equation of gas. In equation (12), "$R_3$" is the gas constant of gas inside the exhaust manifold. In this equation, the gas constant is a constant value.

$$\frac{dM_2}{dt} = \frac{dm_3}{dt} - \frac{dm_4}{dt} \tag{10}$$

$$\frac{1}{\kappa-1}R_3\left(\frac{dM_3}{dt}T_3 + \frac{dT_3}{dt}M_3\right) = \frac{de_3}{dt} - \frac{de_4}{dt} \tag{11}$$

$$P_3V_3 = M_3R_3T_3 \tag{12}$$

As described above, by employing the exhaust manifold model 72, the relation among the mass $M_3$, the pressure $P_3$, the temperature $T_3$, and the volume $V_3$ of gas inside the exhaust manifold, the time-differential value $dm_3/dt$ of the mass flow rate $m_3$ of gas flowing upstream of the exhaust manifold, the time-differential value $de_4/dt$ of the mass flow rate $m_4$ of gas flowing downstream of the exhaust manifold, the time-differential value $de_3/dt$ of the enthalpy $e_3$, and the time-differential value $de_4/dt$ of the enthalpy $e_4$ can be defined using the equations.

F. Cylinder Model (Heat-generation Model)

The cylinder model 68 is regarded as "capacity element", as well as the intake manifold model 64 and the exhaust manifold model 72. However, because air-fuel mixture is burned within the cylinder, the cylinder model 68 differs from the other capacity elements in that the amount $e_{qf}$ of heat generated by combustion and work $W_{crank}$ done by the crankshaft are included in the equation relating to energy balance.

In the cylinder model 68, equations are set up to calculate the mass $M_{cyl}$, the pressure $P_{cyl}$, the temperature $T_{cyl}$, and the volume $V_{cyl}$, of gas inside the cylinder, based on the time-differential value $dm_2/dt$ of the mass flow rate $m_2$ of gas flowing into the cylinder (i.e., gas flowing through the intake valve 46), the time-differential value $de_2/dt$ of the enthalpy $e_2$, the time-differential value $dm_3/dt$ of the mass flow rate $m_3$ of gas discharged from the cylinder (i.e., gas flowing through the exhaust valve 48 downstream of the cylinder), and the time-differential value $de_3/dt$ of the enthalpy $e_3$. That is, in the cylinder model 68, equations (13), (14), and (15) described below are satisfied. Equation (13) is based on the law of conservation of mass, equation (14) is based on the law of conservation of energy, and equation (15) is the state equation of gas. In equation (14), "$R_{cyl}$" is the gas constant of gas inside the cylinder. In this equation, the gas constant is a constant value.

$$\frac{de_2}{dt} - \frac{de_3}{dt} + \frac{de_{qf}}{dt} - \frac{dW_{crank}}{dt} = 0 \quad (13)$$

$$P_{cyl}V_{cyl} = M_{cyl}R_{cyl}T_{cyl} \quad (14)$$

$$\frac{dM_{cyl}}{dt} = \frac{dm_2}{dt} - \frac{dm_3}{dt} \quad (15)$$

In equation (13), "$e_{qf}$" is the amount of heat generated by combustion, and "$de_{qf}/dt$" is the value obtained by differentiating the amount $e_{qf}$ with respect to time in one cycle. "$W_{crank}$" is the work done by the crankshaft 36, and "$dW_{crank}/dt$" is the value obtained by differentiating the work $W_{crank}$ with respect to time in one cycle. As expressed by equation (13), the energy balance among the enthalpy $e_2$ of gas flowing into the cylinder, the enthalpy $e_3$ of gas discharged from the cylinder, the amount $e_{qf}$ of heat generated by combustion, and the work $W_{crank}$ done by the crankshaft is "0" in one cycle.

As described above, by employing the cylinder model 68, the relation among the mass $M_{cyl}$, the pressure $P_{cyl}$, the temperature $T_{cyl}$, the volume $V_{cyl}$ of gas in the cylinder, the time-differential value $dm_2/dt$ of the mass flow rate $m_2$ of gas flowing upstream of the cylinder, the time-differential value $dm_3/dt$ of the mass flow rate $m_3$ of gas flowing downstream of the cylinder, the time-differential value $de_2/dt$ of the enthalpy $d_2$, and the time-differential value $de_3/dt$ of the enthalpy $d_3$ can be defined using the equations.

In the torque estimation model that has the above-described configuration according to this embodiment, the characteristic values, such as the mass "M", the pressure "P", the temperature "T", and the volume "V" of gas, the mass flow rate "m", and the enthalpy "e", can be sequentially determined in the models, by simultaneously performing calculations using the physical equations that represent the models. Thus, the cylinder pressure $P_{cyl}$ can be calculated. The initial values of the mass "M", the pressure "P", the temperature "T", and the volume "V" of gas in the models may be determined in advance, for example, using the values detected by sensors, or the designed values of the capacity elements, as required.

Because equation (13) includes the energy generated by combustion, the amount $e_{qf}$ of heat generated by combustion needs to be calculated separately. Accordingly, in this embodiment, the time-differential value $de_{qf}/dt$ in equation (13) is calculated using the Wiebe function (i.e., equation (16) described below). Using equation (16), the rate $dQ/d\theta$ of heat generation (hereinafter, referred to as "heat-generation rate $dQ/d\theta$") at every predetermined crank angle can be calculated. In equation (16), "Q" is the amount of heat generated by combustion (i.e., the heating value). "Q" indicates the same characteristic value as "$e_{qf}$" in equation (13). That is, the relation between "Q" and "$e_{qf}$" is represented by the equation, "$e_{qf}$=Q".

Equation (17) described below represents the relation between the heat-generation rate $dQ/d\theta$ and the time-differential value $e_{qf}/dt$. In equation (17), "$d\theta/dt$" is the amount of change in the crank angle at a predetermined time interval. Therefore, the value of "$d\theta/dt$" is determined using the value (engine speed) detected by the crank angle sensor 38. Accordingly, the time-differential value $de_{qf}/dt$ in equation (13) is calculated using equations (16) and (17).

$$\frac{dQ}{d\theta} = a \cdot \frac{k \cdot Q_{fuel}}{\theta_p}(m+1)\left(\frac{\theta}{\theta_p}\right)^m \times \exp\left\{-a\left(\frac{\theta}{\theta_p}\right)^{m+1}\right\} \quad (16)$$

$$\frac{de_{qf}}{dt} = \frac{dQ}{dt} = \frac{dQ}{d\theta} \cdot \frac{d\theta}{dt} \quad (17)$$

The relation among the work $W_{crank}$ of the crankshaft 36, the cylinder pressure $P_{cyl}$, and the indicated torque $T_{crank}$ of the crankshaft 36 is represented by equations (18), (19), and (20) described below. In equations (18), (19), and (20), the cylinder volume V and the rate $dV/d\theta$ of change in the cylinder volume V are geometrically determined based on a crank angle $\theta$. Therefore, by simultaneously performing calculations using equations (18), (19), and (20) along with the above-described equations, the cylinder pressure $P_{cyl}$ can be calculated using equation (18), based on the work $W_{crank}$ determined using equation (13). Then, based on the cylinder pressure $P_{cyl}$, the indicated torque $T_{crank}$ of the crankshaft 36 can be calculated using equation (20).

$$\frac{W_{crank}}{dt} = P_{cyl}\frac{dV_{cyl}}{dt} \quad (18)$$

$$\frac{dV_{cyl}}{dt} = \frac{dV_{cyl}}{d\theta} \cdot \frac{d\theta}{dt} \quad (19)$$

$$T_{crank} = P_{cyl}\frac{dV_{cyl}}{d\theta} \quad (20)$$

As described above, in the torque estimation model according to this embodiment, by simultaneously performing calculations using the equations that represent the above-described models in every cycle, the indicated torque $T_{crank}$ can be calculated in each cycle.

For example, a catalyst model may be provided downstream of the exhaust manifold model 72. In the system that includes a supercharger, such as a turbocharger, a supercharger model may be provided.

The method of estimating the torque may further include estimating friction torque of the internal combustion engine; and calculating actual torque output to a drive shaft, based on a difference between the indicated torque and the friction torque. Thus far, the indicated torque $T_{crank}$ has been calculated based on the cylinder pressure $P_{cyl}$ without taking into account the influence of friction torque in the internal combustion engine 10. Therefore, the friction torque may be estimated, and the estimated friction torque may be subtracted from the indicated torque to determine the actual torque output to the crankshaft 36. That is, the relation between the actual torque and the indicated torque is represented by the following equation.

Actual torque=(Indicated torque $T_{crank}$)−(Friction torque)

The friction torque is correlated with parameters such as the engine speed and the temperature of coolant. Therefore, by defining the relation between the friction torque and the parameters in advance, and making a map showing the relation, the friction torque can be calculated using the map. As such, an apparatus according to the invention may further include a means for estimating the friction torque of the internal combustion engine and a means for calculating actual torque output to a drive shaft. Therefore, the actual torque output to the drive shaft can be calculated based on the difference between the indicated torque and the friction torque.

III. Method of Calculating the Heat-generation Rate Using the Wiebe Function

Figure 3:
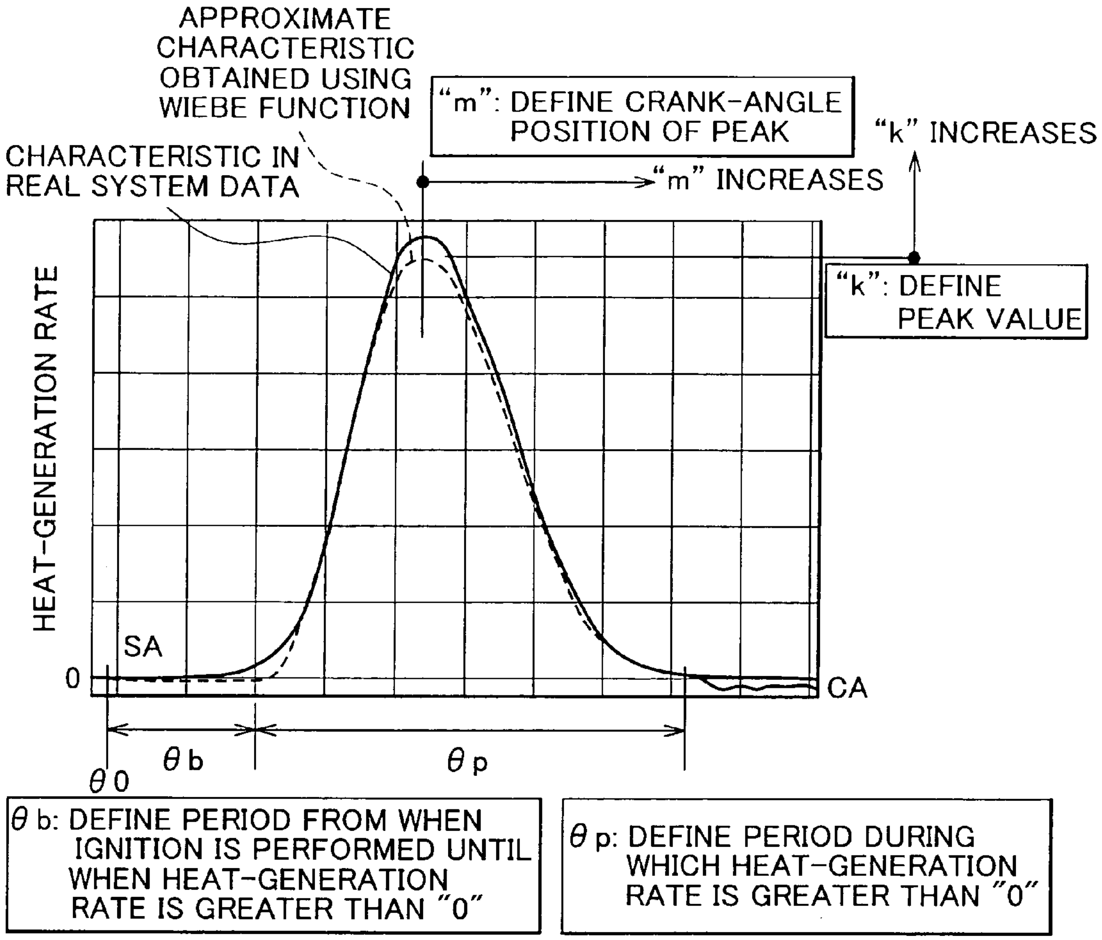
FIG. 3 is a diagram showing the relation between a crank angle [CA] and a heat-generation rate dQ/dθ.

Next, the method of calculating the heat-generation rate $dQ/d\theta$ using the Wiebe function (i.e., the equation (16)) will be described. FIG. 3 is a diagram showing the relation between the crank angle [CA] and the heat-generation rate $dQ/d\theta$. As described above, the heat-generation rate $dQ/d\theta$ indicates the amount of heat generated at every predetermined crank angle. In FIG. 3, a solid line indicates the heat-generation rate in data obtained using a real engine system (hereinafter, referred to as "real system data"), and a dashed line indicates the heat-generation rate calculated using the Wiebe function. The Wiebe function accurately approximates the heat-generation rate in the real system data.

In FIG. 3, ignition is performed at a crank angle $\theta_0$. After the ignition at the crank angle $\theta_0$, the heat-generation rate $dQ/d\theta$ increases as combustion proceeds in the cylinder. After reaching a peak value, the heat-generation rate $dQ/d\theta$ decreases.

The value of a heat input $Q_{fuel}$ is given to the Wiebe function (i.e., equation (16)). The heat input $Q_{fuel}$ is equivalent to the amount of heat contained in the amount of fuel supplied to the cylinder. Accordingly, the heat input $Q_{fuel}$ is equivalent to the value obtained by multiplying the amount of fuel supplied into the cylinder by the lower heating value. The lower heating value is a physical-property value, and may be also referred to as "net heating value". The lower heating value signifies the amount of heat obtained by subtracting the amount of latent heat from the amount of heat generated when the unit amount of fuel is completely burned. The amount of latent heat is the amount of heat required to vaporize water contained in the fuel and water generated by combustion. The heat input $Q_{fuel}$ may be calculated based on the amount of fuel injected from the fuel injection valve 30. Alternatively, the heat input $Q_{fuel}$ may be calculated based on an air-fuel ratio A/F and the amount of air in the cylinder (i.e., a load factor KL).

As shown by equation (16), the Wiebe function includes a plurality of parameters, i.e., "m", "k", "$\theta_p$", and "$\theta_b$". In the Wiebe function, "m" is a shape parameter, "k" is an efficiency parameter, "$\theta_p$" is the combustion period, and "$\theta_b$" is the starting-point deviation amount (in the equation (16), the value of $\theta_b$ is 0). By employing these parameters, the Wiebe function can accurately approximate the actual heat-generation rate. As shown in FIG. 3, these parameters adjust the shape of the Wiebe function. Accordingly, by giving, to the Wiebe function, the value of the heat input $Q_{fuel}$ equal to that in the real system, and setting these parameters to appropriate values, the characteristic of the heat-generation rate in the real system data shown by the solid line in FIG. 3 can be approximated by the Wiebe function. Thus, the heat-generation rate $dQ/d\theta$ at any crank angle can be calculated using the Wiebe function, without obtaining the real system data.

The values of the parameters "m", "k", "$\theta_p$", and "$\theta_b$" are determined based on the operating condition. Thus, the Wiebe function approximates the characteristic of the heat-generation rate in the real system data. Hereinafter, the method of adjusting the parameters "m", "k", "$\theta_p$", and "$\theta_b$" will be described.

A. Shape Parameter "m"

The parameter "m" is referred to as "shape parameter", and adjusts the crank angle at which the heat-generation rate $dQ/d\theta$ reaches the peak value (i.e., the position of the peak of the heat-generation rate $dQ/d\theta$). As the value of "m" in equation (16) increases, the position of the peak of the heat-generation rate $dQ/d\theta$ moves toward a "retarded side" (i.e., the right side in the graph in FIG. 3). Accordingly, by adjusting the parameter "m", the position of the peak of the heat-generation rate $dQ/d\theta$ matches the position of the peak in the real system data.

Figure 4:
FIG. 4 is a schematic diagram showing a map used to determine a parameter "m"

FIG. 4 shows a map used to determine the value of the parameter "m". As shown in FIG. 4, the value of the parameter "m" is determined based on ignition timing SA [BTDC]. As the crank angle corresponding to the ignition timing SA [BTDC] increases, the value of the shape parameter "m" decreases. Using the map in FIG. 4, the optimal value of the shape parameter "m" can be determined based on the ignition timing SA [BTDC]. The value of the parameter "m" may be calculated using a multidimensional map in which, for example, the air-fuel ratio A/F, the engine speed NE, the load factor KL, and valve timing VT are used as parameters, in addition to the ignition timing.

B. Efficiency Parameter "k"

The parameter "k" indicates efficiency. As expressed by equation (16), the heat-generation rate $dQ/d\theta$ is calculated using this efficiency parameter "k". When combustion in the internal combustion engine 10 is simulated using the Wiebe function, the heat input $Q_{fuel}$ is regarded as equivalent to the amount of heat of the fuel supplied to the cylinder. During the actual combustion in the internal combustion engine 10, a certain amount of heat is lost, for example, because the cylinder is cooled or some fuel remains unburned. That is, in reality, all of the heat input $Q_{fuel}$ is not converted to the heating value Q, and the efficiency of converting the heat input $Q_{fuel}$ to the heating value Q is not 100%. In this embodiment, the efficiency parameter "k" is used to reflect this fact in the Wiebe function. That is, the efficiency parameter "k" signifies the efficiency of converting the heat input $Q_{fuel}$ to the heating value Q. Accordingly, the efficiency parameter "k" is greater than 0, and smaller than 1 ($0<k<1$).

When the efficiency parameter "k" is not employed, the peak value of the heat-generation rate $dQ/d\theta$ calculated using the Wiebe function tends to be greater than the peak value in the real system data, because the heat loss that occurs in the real system is not taken into account. In this embodiment, by employing the efficiency parameter "k", the peak value of the heat-generation rate $dQ/d\theta$ can be made substantially equal to the peak value in the real system data. Accordingly, by employing the efficiency parameter "k", the generation of heat in the cylinder can be accurately simulated.

Figure 5:
FIG. 5 is a schematic diagram showing a map used to determine an efficiency parameter "k"

FIG. 5 shows a map used to determine the value of the efficiency parameter "k". As shown in FIG. 5, the value of the efficiency parameter "k" also varies depending on the ignition timing SA [BTDC]. As the crank angle corresponding to the ignition timing SA [BTDC] increases, the value of the efficiency parameter "k" decreases. Using the map in FIG. 5, the optimal value of the efficiency parameter "k" can be determined based on the ignition timing SA [BTDC]. The value of the parameter "m" may be calculated using a multidimensional map in which, for example, the air-fuel ratio A/F, the engine speed NE, the load factor KL, and valve timing VT are used as parameters, in addition to the ignition timing.

Equation (13) based on the law of conservation of energy may further include a term for estimating heat loss. However, because equation (16) includes the efficiency parameter "k", the term for estimating heat loss is not necessary.

C. Combustion Period $\theta_p$

The parameter $\theta_p$ represents the period during which heat continues to be generated by combustion (i.e., combustion period), in terms of crank angle. Accordingly, as the combustion period $\theta_p$ increases, the interval between the crank angle at which the heat-generation rate dQ/dθ starts to increase from 0, and the crank angle at which the heat-generation rate dQ/dθ returns to 0 increases.

Figure 6:
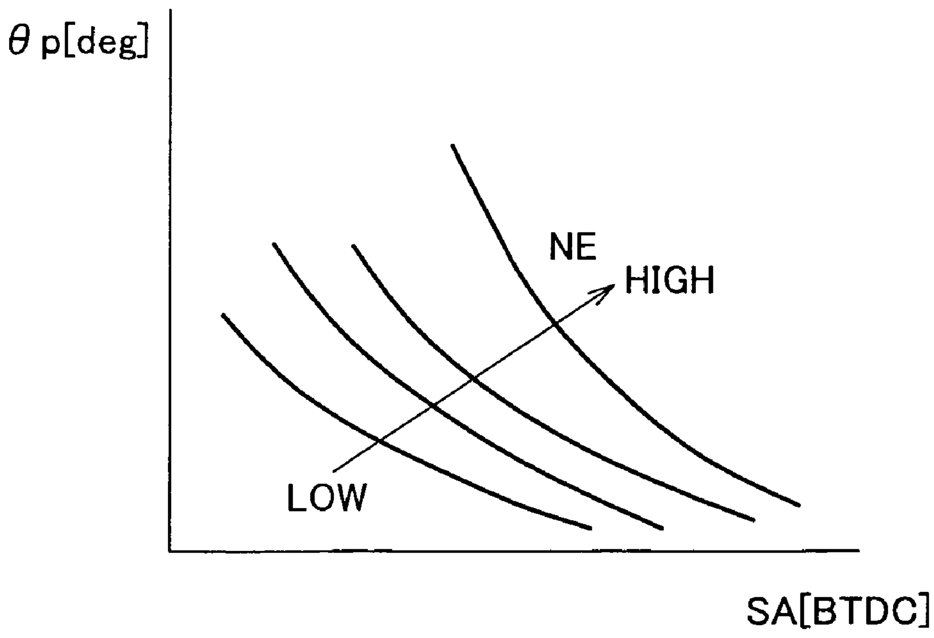
FIG. 6 is a schematic diagram showing a map used to determine a combustion period $\theta_p$.

FIG. 6 shows a map used to determine the value of the combustion period $\theta_p$. As shown in FIG. 6, the value of the combustion period $\theta_p$ is determined based on the ignition timing SA [BTDC] and the engine speed NE. As the crank angle corresponding to the ignition timing SA [BTDC] increases, the combustion period $\theta_p$ decreases. As the engine speed NE increases, the combustion period $\theta_p$ increases. Using the map in FIG. 6, the optimal value of the combustion period $\theta_p$ can be determined based on the ignition timing SA [BTDC] and the engine speed NE. The combustion period $\theta_p$ may be calculated using a multidimensional map in which, for example, the air-fuel ratio A/F, the engine speed NE, the load factor KL, and valve timing VT are used as parameters, in addition to the ignition timing.

D. Starting-point Deviation Amount $\theta_b$

In equation (16), when the value of θ is "0", the heat-generation rate dQ/dθ is "0". When the value of θ starts to increase from "0", the heat-generation rate dQ/dθ starts to increase from "0". This indicates that the heat generation starts. That is, in the Wiebe function model in this embodiment, "θ" represents the elapsed period since the heat generation starts, in terms of crank angle. Accordingly, the crank angle at which the value of the elapsed period θ is "0" is regarded as the crank angle at which the heat generation starts (hereinafter, referred to as "heat-generation starting point"). In the conventional simulation using the Wiebe function, the heat-generation starting point (i.e., the point at which the value of the elapsed period θ is "0") is the same as the crank angle corresponding to the ignition timing.

However, when the heat-generation starting point is the same as the ignition timing, it is difficult to accurately perform the simulation. FIG. 7 is a schematic diagram explaining this problem. In FIG. 7, a thick solid line indicates the heat-generation rate dQ/dθ in the real system data. A thin solid line indicates the heat-generation rate dQ/dθ calculated using the Wiebe function model.

Figure 7A:
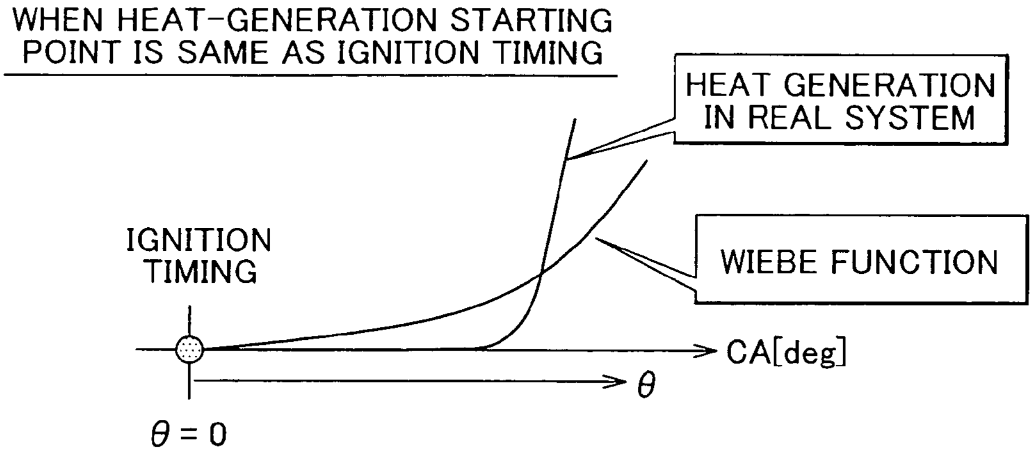
FIG. 7 is a schematic diagram explaining a problem that occurs when a heat-generation starting point is the same as actual ignition timing in a Wiebe function model.
Figure 7B:
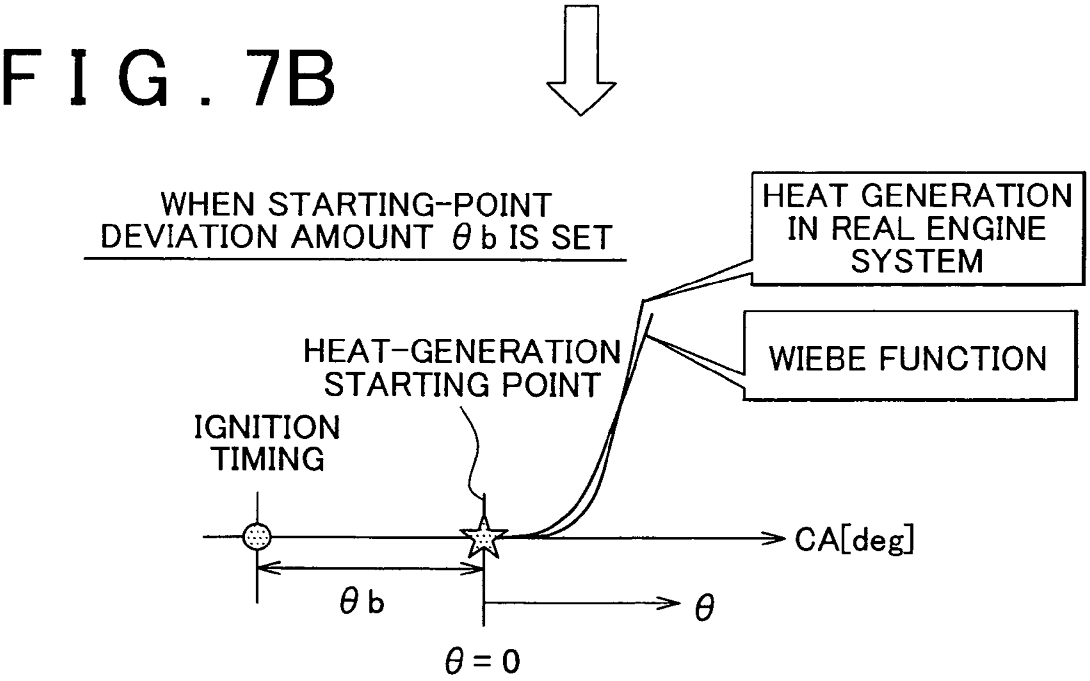

As shown in FIG. 7A, when the heat-generation starting point is the same as the ignition timing, the result of the calculation using the Wiebe function may not match the real system data, even if any parameter in the Wiebe function is changed in any manner. In this case, as shown in FIG. 7B, the heat-generation starting point (i.e., the point at which the elapsed period θ is "0") deviates from the ignition timing. As a result, the point at which the dQ/dθ starts to increase in the result of the calculation using the Wiebe function model matches the point at which the dQ/dθ starts to increase in the real system data. Hereinafter, the amount of deviation of the heat-generation starting point from the ignition timing will be referred to as "starting-point deviation amount θb". By employing the starting-point deviation amount $\theta_b$, the generation of heat in the cylinder can be accurately simulated.

The starting-point deviation amount $\theta_b$ varies depending on the operating condition of the internal combustion engine. Therefore, the relation between the operating condition and the starting-point deviation amount $\theta_b$ needs to be determined to accurately simulate the operation of the internal combustion engine 10 using the Wiebe function model.

Figure 8:
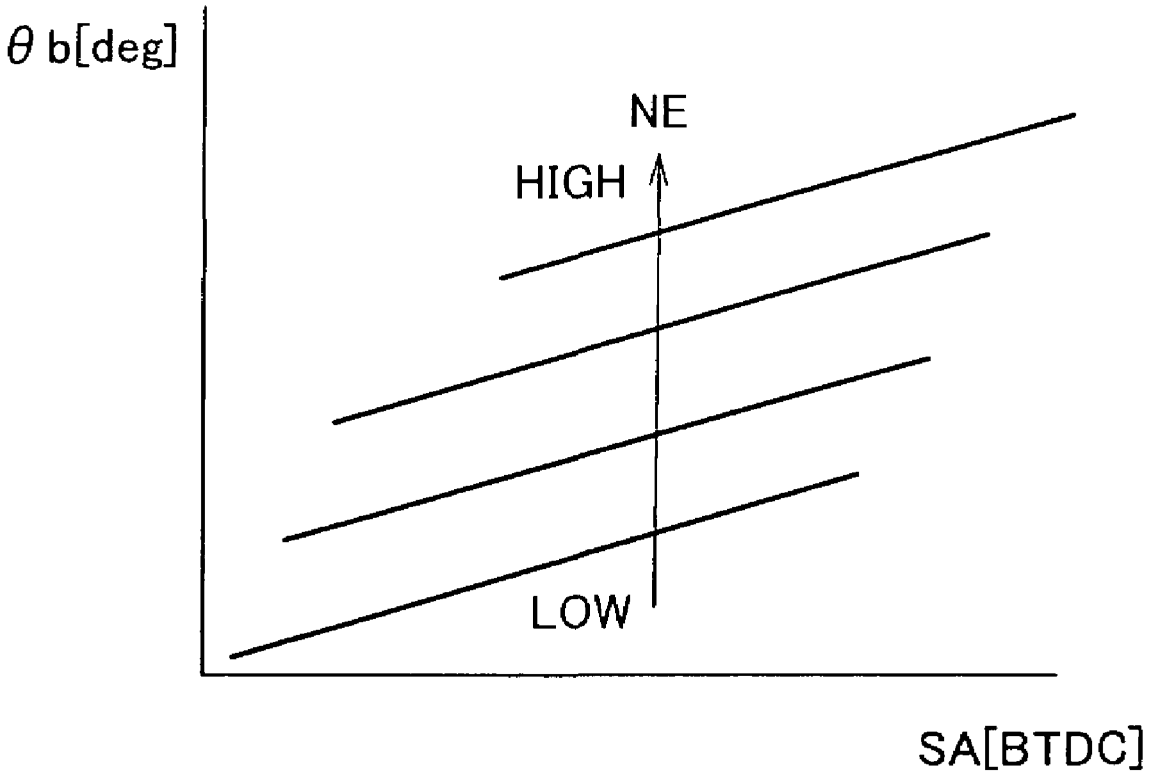
FIG. 8 is a schematic diagram showing a map used to determine a starting-point deviation amount $\theta_b$.

FIG. 8 shows a map used to determine the value of the starting-point deviation amount $\theta_b$. As shown in FIG. 8, the value of the starting-point deviation amount $\theta_b$ is determined based on the ignition timing SA [BTDC] and the engine speed NE. As the crank angle corresponding to the ignition timing SA [BTDC] increases, the starting-point deviation amount $\theta_b$ increases. As the engine speed NE increases, the starting-point deviation amount $\theta_b$ increases. Using the map in FIG. 8, the optimal value of the starting-point deviation amount $\theta_b$ can be determined based on the ignition timing SA [BTDC] and the engine speed NE. The starting-point deviation amount $\theta_b$ may be calculated using a multidimensional map in which, for example, the air-fuel ratio A/F, the engine speed NE, the load factor KL, and valve timing VT are used as parameters, in addition to the ignition timing.

In equation (16), a coefficient "a" is a predetermined coefficient. The coefficient "a" is included in equation (16) to calculate the heat-generation rate when the value of the elapsed period θ is equal to the value of the combustion period $\theta_p$, that is, the combustion ends.

As described above, according to the method in this embodiment, the values of the parameters "m", "k", "$\theta_p$", and "$\theta_b$" can be calculated using the maps in FIG. 4, FIG. 5, FIG. 6, and FIG. 8. As a result, the characteristic of the heat-generation rate determined using the Wiebe function accurately matches the characteristic of the measured heat-generation rate. Thus, the heat-generation rate can be accurately estimated using equation (16). The relation between each of the parameters "m", "k", "$\theta_p$", and "$\theta_b$", and the operating condition may be defined using an approximate expression.

IV. Method of Making Each Map

Next, the method of making the maps used to calculate the values of the parameters "m", "k", "$\theta_p$", and "$\theta_b$" in the Wiebe function will be described. The values of the parameters "m", "k", "$\theta_p$" and "$\theta_b$" in the Wiebe function are determined by fitting the Wiebe function to the real system data.

First, the method of obtaining the real system data on the heat-generation rate dQ/dθ will be described. The pressure in the cylinder is estimated using the torque estimation model, and the indicated torque is estimated based on the estimated pressure in the cylinder. In particular, the cylinder pressure P is measured by the cylinder pressure sensor 44 at each predetermined crank angle (for example, at each 1 deg CA). Because the cylinder pressure is correlated with the indicated torque, the indicated torque can be estimated based on the cylinder pressure that is estimated using the torque estimation model. The relation between the cylinder pressure P, the cylinder volume V, and the heating value Q is represented by equation (21) based on the law of conservation of energy, described below. In an apparatus according the invention, an indicated torque estimation means may be provided that estimates the pressure in the cylinder using the torque estimation model, and estimates the indicated torque based on the estimated pressure in the cylinder.

$$\frac{dQ}{d\theta} = \frac{1}{\kappa - 1}\left(V\frac{dP}{d\theta} + \kappa P\frac{dV}{d\theta}\right) \tag{21}$$

In equation (21), "κ" is the ratio of specific heat capacities. The cylinder volume V and the change rate dV/dθ (i.e., the rate of change in the cylinder volume V) are geometrically determined based on the crank angle θ. Accordingly, by giving, into equation (22), the value of the cylinder pressure P measured at each predetermined crank angle, the real system data on the heat-generation rate dQ/dθ can be obtained.

Figure 9:
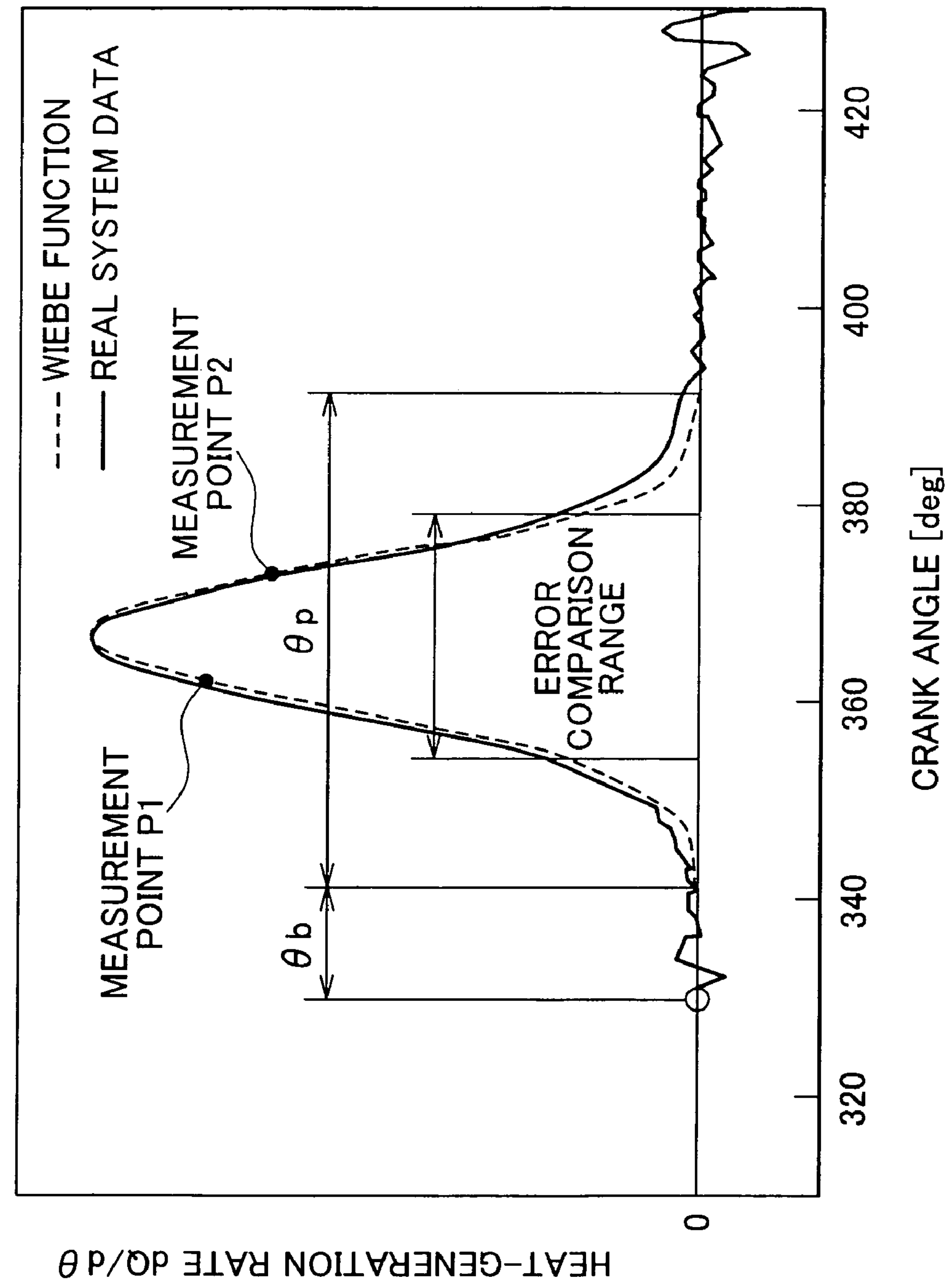
FIG. 9 is a schematic diagram explaining the method of fitting the Wiebe function to real system data.

FIG. 9 is a schematic diagram explaining the method of fitting the Wiebe function to the real system data. In FIG. 9, a solid line indicates the real system data on the heat-generation rate dQ/dθ. A dashed line indicates the result of the calculation using the Wiebe function model. In this case, when the heat-generation rate dQ/dθ is calculated using the Wiebe function model, the heat input $Q_{fuel}$, the starting-point deviation amount $\theta_b$, the efficiency parameter "k", the combustion period $\theta_p$, and the shape parameter "m" are fitted to the real system data (i.e., the parameters are optimized) using the least-square method to minimize the error between the result of the calculation using the Wiebe function model and the real system data.

More specifically, a plurality of measurement points (two measurement points P1, P2) are set within an "error comparison range" shown in FIG. 9. Then, the values of the starting-point deviation amount $\theta_b$, the efficiency parameter "k", the combustion period $\theta_p$, and the shape parameter "m" are determined to minimize the square sum of the errors (deviations) between the result of the calculation using the Wiebe function model and the real system data obtained at the measurement points P1 and P2. The determined values are regarded as the optimized values. By performing this fitting process under each of different operating conditions, the maps in FIG. 4, FIG. 5, FIG. 6, and FIG. 8 can be made.

The Wiebe function has the characteristic that is close to the characteristic of the heat-generation rate dQ/dθ in the real engine system. Therefore, it is possible to minimize the number of measurement points at which the real system data and the result of the calculation using the Wiebe function model need to be obtained to obtain the above-described deviation. Accordingly, the heat-generation rate dQ/dθ in the real system needs to be measured at only the set measurement points. That is, it is possible to minimize the number of the points at which the cylinder pressure is measured. Thus, the number of man-hours required to fit the Wiebe function model to the real system data (i.e., the number of man-hours required to perform the fitting process) is significantly reduced.

For example, a bench test may be performed for the internal combustion engine 10 using the torque estimation model according to this embodiment, the indicated torque may be calculated based on the operating condition, and the indicated torque may be reflected in the development of the ECU 40 of the internal combustion engine. In this case, because the number of measurement points can be minimized, the time required to make the maps can be shortened, and the development period can be greatly shortened. Also, the Wiebe function model very accurately approximates the operating state between the measurement points in the real system data. Therefore, the accuracy of the calculation performed by the ECU 40 is improved. Further, even when it is difficult to measure the torque in a stationary test, for example, due to the high temperature of exhaust gas (for example, when the ignition timing is greatly retarded), the torque can be estimated.

When the torque estimation model and the maps in FIG. 4, FIG. 5, FIG. 6, and FIG. 8 are set in the ECU 40 of the internal combustion engine 10, the internal combustion engine 10 can be controlled based on the calculated torque $T_{crank}$. In this case as well, the Wiebe function model very accurately approximates the operating state between the measurement points in the real system data. Therefore, the torque $T_{crank}$ can be accurately calculated at each predetermined crank angle. Based on the calculated torque $T_{crank}$, the internal combustion engine 10 can be operated in a desired operating state.

Figure 10:
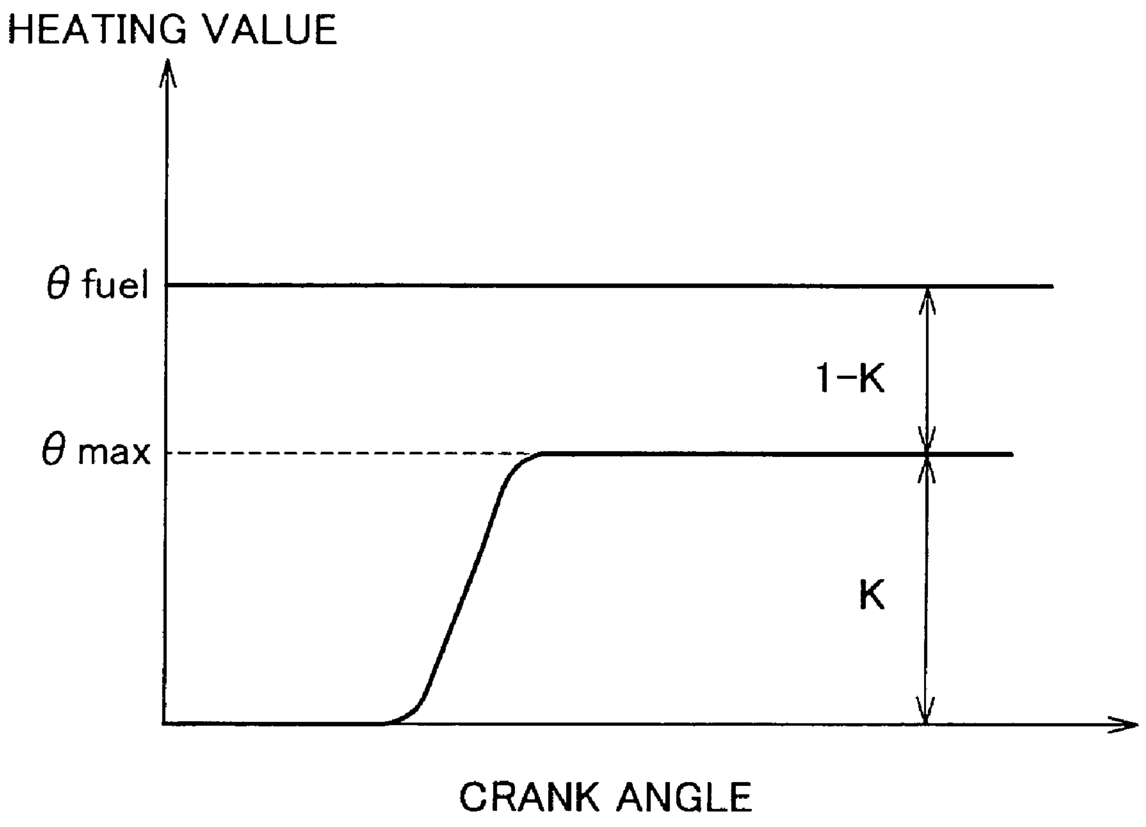
FIG. 10 is a diagram explaining the definition of the efficiency parameter "k"

The efficiency parameter "k", and starting-point deviation amount $\theta_b$ may be calculated directly based on the real system data, without using the maps or the approximate expressions. FIG. 10 is a diagram explaining the definition of the efficiency parameter "k". In the real system data on the heat-generation rate dQ/dθ, the efficiency "k" is defined as follows. In FIG. 10, "$Q_{fuel}$" signifies the amount of heat of the fuel supplied to the cylinder. The value of $Q_{fuel}$ is determined based on the amount of fuel injected from the fuel injection valve 30, or based on the air-fuel ratio A/F and the amount of air in the cylinder. In FIG. 10, "$Q_{max}$" is the value obtained by integrating the values of dQ/dθ in the real system data with respect to θ. That is, the value of "$Q_{max}$" is equivalent to the area defined by a curve line indicating the heat-generation rate dQ/dθ in the real system data, and a straight line indicating that the value of dQ/dθ is "0". "$Q_{max}$" signifies the gross heating value. Accordingly, the efficiency parameter "k" is calculated using the equation, $k=Q_{max}/Q_{fuel}$.

Figure 11:
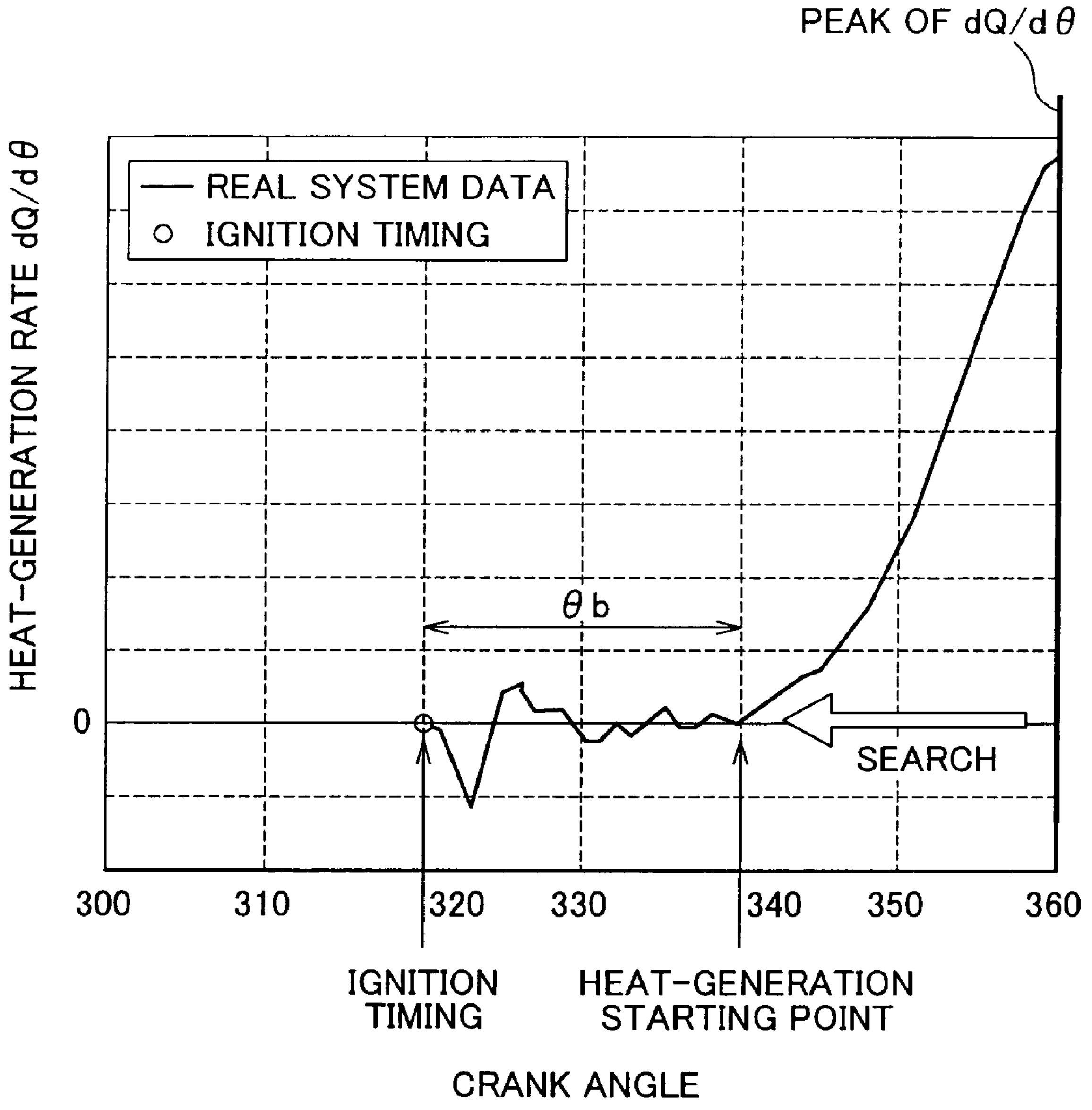
FIG. 11 is a diagram explaining the method of determining the starting-point deviation amount $\theta_b$ based on the real system data on a heat-generation rate dQ/dθ.

FIG. 11 is a diagram explaining the method of determining the value of the starting-point deviation amount $\theta_b$ based on the real system data on the heat-generation rate dQ/dθ. In FIG. 11, a solid line indicates the enlarged first half of the real system data. As shown in FIG. 11, the value of the heat-generation rate dQ/dθ in the real system data fluctuates around "0" immediately after the ignition timing. Then, the value of the heat-generation rate dQ/dθ starts to increase. Accordingly, the point at which the value of the heat-generation rate dQ/dθ starts to increase (i.e., the heat-generation starting point) is determined by searching for the point at which the value of the heat-generation rate dQ/dθ first reaches "0" in the direction from the position of the peak of the heat-generation rate dQ/dθ to the ignition timing. Thus, when the value of the starting-point deviation amount $\theta_b$ is determined based on the real system data, the heat-generation starting point is set to the point at which the value of the heat-generation rate dQ/dθ reaches "0" under each of different operating conditions while the ignition timing, the engine speed, and the like are changed. Then, the crank-angle interval between the heat-generation starting point and the ignition timing is determined, and the determined crank-angle interval is regarded as the starting-point deviation amount $\theta_b$.

As described above, in this embodiment, the values of the parameters "m", "k", "$\theta_p$", "$\theta_b$" in the Wiebe function are calculated based on the operating state using the maps, and the indicated torque is calculated using the heat-generation rate calculated using the Wiebe function. Therefore, the indicated torque of the internal combustion 10 can be accurately calculated. Thus, the number of man-hours required to perform the fitting process can be greatly reduced, as compared to when the torque is calculated directly based on the operating condition.

Accordingly, when the ECU 40 of the internal combustion engine 10 is developed based on a bench test, the number of measurement points necessary for making the maps can be greatly reduced. Therefore, the development period can be shortened. Also, the Wiebe function model very accurately approximates the operating state between the measurement points in the real system data. Therefore, even when the number of measurement points is reduced, a decrease in the accuracy of estimating the torque can be suppressed. As a result, the internal combustion engine 10 can be accurately controlled. Further, when the torque estimation model is set in the ECU 40 installed in the vehicle, the indicated torque $T_{crank}$ can be accurately calculated at each predetermined crank angle. Based on the indicated torque $T_{crank}$, the internal combustion engine 10 can be operated in a desired operating state.

What is claimed is:

1. An engine output calculation apparatus comprising:

a model making means for making a torque estimation model that defines a relation between indicated torque and characteristic values indicating a flow of gas and a combustion state in an internal combustion engine;

a parameter determination means for determining a value of a parameter relating to a heat-generation rate dQ/dθ that is a rate of change in a heating value Q in a cylinder with respect to a crank angle θ, based on an operating condition;

a heat-generation rate calculation means for calculating the heat-generation rate dQ/dθ under a desired operating condition, using the value of the parameter; and an indicated torque estimation means for estimating the indicated torque of the internal combustion engine based on the torque estimation model, using the heat-generation rate dQ/dθ.

2. The engine output calculation apparatus according to claim 1, wherein the parameter determination means determines the value of the parameter using a map or an approximation expression that defines a relation between the operating condition and the parameter.

3. The engine output calculation apparatus according to claim 2, wherein the heat-generation rate calculation means calculates the heat-generation rate dQ/dθ using a function that includes a plurality of parameters relating to the heat-generation rate dQ/dθ, and that approximates a characteristic of an actual heat-generation rate using the plurality of the parameters.

4. The engine output calculation apparatus according to claim 3, wherein the function is a Wiebe function, and the plurality of the parameters include a shape parameter m, an efficiency parameter k, a combustion period $\theta_p$, and a starting-point deviation amount $\theta_b$.

5. The engine output calculation apparatus according to claim 1, wherein the indicated torque estimation means estimates a pressure in the cylinder using the torque estimation model, and estimates the indicated torque based on the estimated pressure in the cylinder, in the step of estimating the indicated torque.

6. The engine output calculation apparatus according to claim 1, wherein the torque estimation model includes an intake-air flow calculation model, an exhaust-gas flow calculation model, and a heat-generation calculation model; and the indicated torque estimation means estimates the indicated torque by introducing the heat-generation rate dQ/dθ to the heat-generation calculation model.

7. The engine output calculation apparatus according to claim 6, wherein the torque estimation model is formed by alternately arranging capacity elements and flow elements in a gas passage for the internal combustion engine, and connecting the capacity elements with the flow elements; and the capacity elements are modeled using a law of conservation of energy, a law of conservation of mass, and a state equation of gas, and the flow elements are modeled using a nozzle equation for compressible fluid.

8. The engine output calculation apparatus according to claim 1, further comprising:

a means for estimating friction torque of the internal combustion engine; and a means for calculating actual torque output to a drive shaft, based on a difference between the indicated torque and the friction torque.

9. An engine output calculation apparatus comprising:

a model making portion that makes a torque estimation model that defines a relation between indicated torque and characteristic values indicating a flow of gas and a combustion state in an internal combustion engine;

a parameter determination portion that determines a value of a parameter relating to a heat-generation rate dQ/dθ that is a rate of change in a heating value Q in a cylinder with respect to a crank angle θ, based on an operating condition;

a heat-generation rate calculation portion that calculates the heat-generation rate dQ/dθ under a desired operating condition, using the value of the parameter; and an indicated torque estimation portion that estimates the indicated torque of the internal combustion engine based on the torque estimation model, using the heat-generation rate dQ/dθ.

10. The engine output calculation apparatus according to claim 9, wherein the parameter determination portion determines the value of the parameter using a map or an approximation expression that defines a relation between the operating condition and the parameter.

11. The engine output calculation apparatus according to claim 10, wherein the heat-generation rate calculation portion calculates the heat-generation rate dQ/dθ using a function that includes a plurality of parameters relating to the heat-generation rate dQ/dθ, and that approximates a characteristic of an actual heat-generation rate using the plurality of the parameters.

12. The engine output calculation apparatus according to claim 11, wherein the function is a Wiebe function, and the plurality of the parameters include a shape parameter m, an efficiency parameter k, a combustion period $\theta_p$, and a starting-point deviation amount $\theta_b$.

13. The engine output calculation apparatus according to claim 9, wherein the indicated torque estimation portion estimates a pressure in the cylinder using the torque estimation model, and estimates the indicated torque based on the estimated pressure in the cylinder, in the step of estimating the indicated torque.

14. The engine output calculation apparatus according to claim 9, wherein the torque estimation model includes an intake-air flow calculation model, an exhaust-gas flow calculation model, and a heat-generation calculation model; and the indicated torque estimation portion estimates the indicated torque by introducing the heat-generation rate dQ/dθ to the heat-generation calculation model.

15. The engine output calculation apparatus according to claim 14, wherein the torque estimation model is formed by alternately arranging capacity elements and flow elements in a gas passage for the internal combustion engine, and connecting the capacity elements with the flow elements; and the capacity elements are modeled using a law of conservation of energy, a law of conservation of mass, and a state equation of gas, and the flow elements are modeled using a nozzle equation for compressible fluid.

16. The engine output calculation apparatus according to claim 9, further comprising:

a friction torque estimation portion that estimates friction torque of the internal combustion engine; and a torque output calculation portion that calculates actual torque output to a drive shaft, based on a difference between the indicated torque and the friction torque.

17. An engine output calculation method, comprising:

making a torque estimation model that defines a relation between indicated torque and characteristic values that indicate a flow of gas and a combustion state in an internal combustion engine;

determining a value of a parameter relating to a heat-generation rate dQ/dθ, which is a rate of change of a heating value Q in a cylinder with respect to a crank angle θ, based on an operating condition;

calculating the heat-generation rate dQ/dθ under a desired operating condition, using the value of the parameter; and estimating the indicated torque of the internal combustion engine based on the torque estimation model, using the heat-generation rate dQ/dθ.

18. The engine output calculation method according to claim 17, wherein the value of the parameter relating to the heat-generation rate dQ/dθ is determined using a map or an approximation expression that defines a relation between the operating condition and the parameter, in the step of determining the value of the parameter.

19. The engine output calculation method according to claim 18, wherein the heat-generation rate dQ/dθ is calculated using a function that includes a plurality of parameters relating to the heat-generation rate dQ/dθ and that approximates a characteristic of an actual heat-generation rate using the plurality of parameters, in the step of calculating the heat-generation rate dQ/dθ.

20. The engine output calculation method according to claim 19, further comprising:

determining the actual heat-generation rate based on a measured value of a pressure in the cylinder under each of predetermined operating conditions; and making the map or the approximate expression that defines the relation between the operating condition and each of the plurality of the parameters, by setting the value for each of the plurality of the parameters such that the actual heat-generation rate matches a value calculated by the function, under each of the predetermined operating conditions.

21. The engine output calculation method according to claim 19, wherein the function is a Wiebe function, and the plurality of parameters include a shape parameter m, an efficiency parameter k, a combustion period $\theta_p$, and a starting-point deviation amount $\theta_b$.

22. The engine output calculation method according to claim 17, wherein a pressure in the cylinder is estimated using the torque estimation model, and the indicated torque is estimated based on the estimated pressure in the cylinder, in the step of estimating the indicated torque.

23. The engine output calculation method according to claim 17, wherein the torque estimation model includes an intake-air flow calculation model, an exhaust-gas flow calculation model, and a heat-generation calculation model; and the indicated torque is estimated by introducing the heat-generation rate dQ/dθ to the heat-generation calculation model, in the step of estimating the indicated torque.

24. The engine output calculation method according to claim 23, wherein the torque estimation model is formed by alternately arranging capacity elements and flow elements in a gas passage for the internal combustion engine, and connecting the capacity elements with the flow elements; and the capacity elements are modeled using a law of conservation of energy, a law of conservation of mass, and a state equation of gas, and the flow elements are modeled using a nozzle equation for compressible fluid.

25. The engine output calculation method according to claim 17, further comprising:

estimating friction torque of the internal combustion engine; and calculating actual torque output to a drive shaft, based on a difference between the indicated torque and the friction torque.

* * * * *